United States Patent
Park et al.

(10) Patent No.: US 7,903,818 B2
(45) Date of Patent: Mar. 8, 2011

(54) RANDOM ACCESS METHOD FOR IMPROVING SCRAMBLING EFFICIENCY

(75) Inventors: Sung Jun Park, Anyang-si (KR); Seung June Yi, Anyang-si (KR); Young Dae Lee, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/382,294

(22) Filed: Mar. 12, 2009

(65) Prior Publication Data

US 2009/0238366 A1 Sep. 24, 2009

Related U.S. Application Data

(60) Provisional application No. 61/036,455, filed on Mar. 13, 2008, provisional application No. 61/038,470, filed on Mar. 21, 2008, provisional application No. 61/048,549, filed on Apr. 28, 2008.

(30) Foreign Application Priority Data

Feb. 27, 2009 (KR) ................. 10-2009-0016820

(51) Int. Cl.
*H04L 9/00* (2006.01)
(52) U.S. Cl. ................... 380/270; 370/335; 370/342
(58) Field of Classification Search ............. 380/270
See application file for complete search history.

(56) References Cited

U.S. PATENT DOCUMENTS

| | | | | |
|---|---|---|---|---|
| 3,119,097 A | * | 1/1964 | Tullos | 341/178 |
| 3,418,629 A | * | 12/1968 | Chien | 714/782 |
| 3,439,279 A | * | 4/1969 | Guanella | 327/160 |
| 6,028,854 A | | 2/2000 | Raith et al. | |
| 2003/0016698 A1 | | 1/2003 | Chang et al. | |
| 2005/0135318 A1 | | 6/2005 | Walton et al. | |
| 2005/0141436 A1 | | 6/2005 | Dick et al. | |
| 2005/0221833 A1 | * | 10/2005 | Granzow et al. | 455/450 |
| 2005/0287957 A1 | | 12/2005 | Lee et al. | |
| 2006/0023629 A1 | | 2/2006 | Kim et al. | |
| 2006/0251105 A1 | | 11/2006 | Kim et al. | |
| 2006/0281417 A1 | | 12/2006 | Umesh et al. | |
| 2007/0140178 A1 | | 6/2007 | Jung et al. | |

(Continued)

FOREIGN PATENT DOCUMENTS

JP 2006-87120 A 3/2006

(Continued)

OTHER PUBLICATIONS

Nokia Corporation et al., "On Resource Release in Enhanced UL for CELL_FACH", 3GPP Draft; R2-080272, Jan. 7, 2008.

(Continued)

*Primary Examiner* — Kambiz Zand
*Assistant Examiner* — Dant B Shaifer Harriman
(74) *Attorney, Agent, or Firm* — McKenna Long & Aldridge LLP

(57) ABSTRACT

A random access method for improving scrambling performance is disclosed. In particular, when a terminal performs a random access to a specific network, the present invention proposes a scheme for transmitting an uplink transmission signal corresponding to an uplink grant by scrambling the uplink transmission signal using a terminal identification information value received via a random access response message. Preferably, the terminal identification information value used for the scrambling is able to use a temporary C-RNTI received via the random access response message.

11 Claims, 9 Drawing Sheets

U.S. PATENT DOCUMENTS

| | | | |
|---|---|---|---|
| 2007/0189236 A1* | 8/2007 | Ranta-aho et al. | 370/335 |
| 2007/0206531 A1* | 9/2007 | Pajukoski et al. | 370/329 |
| 2007/0242764 A1* | 10/2007 | Anigstein et al. | 375/260 |
| 2007/0248060 A1 | 10/2007 | Mooney et al. | |
| 2007/0258402 A1* | 11/2007 | Nakamata et al. | 370/329 |
| 2007/0288824 A1 | 12/2007 | Yeo et al. | |
| 2007/0291719 A1* | 12/2007 | Demirhan et al. | 370/338 |
| 2008/0005638 A1 | 1/2008 | Kuo et al. | |
| 2008/0209076 A1 | 8/2008 | Wang et al. | |
| 2009/0041240 A1* | 2/2009 | Parkvall et al. | 380/247 |
| 2009/0103500 A1 | 4/2009 | Malkamaki et al. | |
| 2009/0168731 A1 | 7/2009 | Zhang et al. | |
| 2009/0245194 A1 | 10/2009 | Damnjanovic et al. | |
| 2009/0287976 A1 | 11/2009 | Wang et al. | |
| 2010/0067460 A1 | 3/2010 | Hu et al. | |

FOREIGN PATENT DOCUMENTS

| | | |
|---|---|---|
| KR | 10-2001-0110188 A | 12/2001 |
| KR | 10-2003-0043426 A | 6/2003 |
| KR | 10-2005-0120189 | 12/2005 |
| KR | 10-2006-0067329 A | 6/2006 |
| KR | 10-2006-0131808 A | 12/2006 |
| KR | 10-2007-0026156 | 3/2007 |
| KR | 10-2007-0080544 A | 8/2007 |
| KR | 10-2007-0121505 | 12/2007 |
| KR | 10-2008-0003682 A | 1/2008 |
| KR | 10-2008-0018105 A | 2/2008 |
| WO | WO 2005/125226 | 12/2005 |
| WO | WO 2007/091520 | 8/2007 |
| WO | WO 2007/148706 | 12/2007 |
| WO | WO 2009/020423 | 2/2009 |
| WO | WO 2009/045011 | 4/2009 |

OTHER PUBLICATIONS

NEC, "Comparison of HS-based E-RACH resource assignment", 3GPP Draft; R2-080128, Comparison of HS-Based E-Rach Resource Assignment, 3$^{rd}$ Generation Partnership Project (3GPP), Jan. 9, 2008.

LG Electronics, "Load Management of E-DCH Resource Release", 3GPP TSG-RAN WG2 #61BIS, R2-081829, Mar. 31, 2008, p. 1-4.

Ericsson, "Back-off operation for enhanced uplink in CELL_FACH", 3GPP Draft, R2-081502_EUL_BACK_OFF, 3$^{rd}$ Generation Partnership Project (3GPP), Mar. 25, 2008.

Persson, F., "Voice over IP Realized for the 3GPP Long Term Evolution", Vehicular Technology Conference, IEEE 66$^{th}$, 2007, pp. 1436-1440.

3GPP TS 36.300 V8.4.0: 3$^{rd}$ Generation Partnership Project; Technical Specification Group Radio Access Network: Evolved Universal Terrestrial Radio Access (E-UTRA) and Evolved Universal Terrestrial Radio Access Network (E-UTRAN); Overall description; Stage 2 (Release 8); Mar. 17, 2008.

3GPP TS 36.321, V8.0.0, Medium Access Control Protocol Specification, Dec. 1, 2007, pp. 1-23, XP002521635.

LG Electronics: "HARQ Feedback and Measurement Gap", 3GPP Draft, R2-081602 HARQ Feedback and Measurement Gap_RO, 3$^{rd}$ Generation Partnership Project (3GPP), RAN WG2, Mar. 25, 2008.

NTT Docomo et al.: "UL HARQ handling when P-HICH collides with measurement gap", 3GPP Draft, R2-081727, 3$^{rd}$ Generation Partnership Project (3GPP), RAN WG2, Mar. 25, 2008.

Ericsson: "E-UTRAN Random Access procedure C-RNTI assignment and HARQ on message 4 with RACH model" 3GPP Draft; R2-070365, 3rd Generation Partnership Project (3GPP), vol. RAN WG2, XP050133443, Jan. 2007.

Ericsson: 3GPP Draft; R1-080898, 3rd Generation Partnership Project (3GPP), vol. RAN WG1, XP050109373, Feb. 2008.

LG Electronics Inc: "Allocation of a "short" CRNTI in msg2" 3GPP Draft; R2-081038 Short CRNTI, 3rd Generation Partnership Project (3GPP), vol. RAN WG2, XP050138828, Feb. 2008.

Nokia Siemens Networks et al: "Way Forward on Scrambling Sequence Initialisation", 3GPP Draft; R1-081128_Scrambling, 3rd Generation Partnership Project (3GPP), vol. RAN WG1, XP050109572, Feb. 2008.

LG Electronics Inc., "Scrambling of Message 3", 3GPP Draft; R2-082508, 3rd Generation Partnership Project(3GPP), vol. RAN WG2, XP050140189, May 2008.

* cited by examiner

- Prior Art -

FIG. 7
- Prior Art -

| R | Timing Advance Command | | Oct 1 |
| Timing Advance Command | UL Grant | | Oct 2 |
| UL Grant | | | Oct 3 |
| UL Grant | | | Oct 4 |
| Temporary C-RNTI | | | Oct 5 |
| Temporary C-RNTI | | | Oct 6 |

RANDOM ACCESS METHOD FOR IMPROVING SCRAMBLING EFFICIENCY

CROSS REFERENCE TO RELATED APPLICATIONS

This application claims the benefit of the U.S. provisional Application Nos. 61/036,455, 61/038,470 and 61/048,549, filed on Mar. 13, 2008, Mar. 21, 2008 and Apr. 28, 2008, respectively, which are hereby incorporated by reference as if fully set forth herein This application claims the benefit of the Korean Patent Application No. 10-2009-0016820, filed on Feb. 27, 2009, which is hereby incorporated by reference as if fully set forth herein.

BACKGROUND OF THE INVENTION

1. Field of the Invention

The present invention relates to a random access method for improving scrambling efficiency, and more particularly, to an apparatus for improving scrambling/descrambling performance and method thereof. Although the present invention is suitable for a wide scope of applications, it is particularly suitable for improving performance of scrambling/descrambling performed in a random access procedure within a mobile communication system.

2. Discussion of the Related Art

First of all, 3GPP LTE ($3^{rd}$ generation partnership project) long term evolution: hereinafter called 'LTE') communication system is schematically described as a mobile communication system to which the present invention is applicable.

FIG. 1 is a schematic diagram of E-UMTS network structure as an example of a mobile communication system.

Referring to FIG. 1, E-UMTS (evolved universal mobile telecommunications system) is the system having evolved from UMTS (universal mobile telecommunications system) and its basic standardization is ongoing by 3GPP. Generally, the E-UMTS can be called LTE system.

E-UMTS network can be mainly divided into E-TRAN 101 and CN 102 (core network). The E-UTRAN (evolved-UMTS terrestrial radio access network) 101 consists of a user equipment (hereinafter abbreviated UE) 103, a base station (hereinafter named eNode B or eNB) 104, and an access gateway (hereinafter abbreviated AG) 105 located at an end point of the network to be externally connected to an external network. The AG 105 can be divided into one part responsible for user traffic processing and the other part for processing control traffic. In this case, the AG for new user traffic processing and the AG for processing control traffic can communicate with each other using a new interface.

At least one cell can exist at one eNode B. Between eNode Bs, an interface for user or control traffic transmission is usable. And, the CN 102 can consist of a node for user registrations of the AG 105 and other UE 103. Moreover, an interface for discriminating the E-UTRAN 101 and the CN 102 is available.

Layers of a radio interface protocol between a user equipment and a network can be divided into L1 (first layer), L2 (second layer) and L3 (third layer) based on three lower layers of the open system interconnection (OSI) reference model widely known in the field of communication systems. A physical layer belonging to the first layer provides an information transfer service using a physical channel. A radio resource control (hereinafter abbreviated RRC) located on the third layer plays a role in controlling radio resources between the user equipment and the network. For this, the RRC layers exchange RRC messages between the user equipment and the network. The RRC layers can be distributed to network nodes including the eNode B 104, the AG 105 and the like. Moreover, the RRC layer can be provided to the eNode B 104 or the AG 105 only.

FIG. 2 and FIG. 3 are diagrams for structures of a radio interface protocol between a user equipment and UTRAN based on the 3GPP radio access network specifications.

Referring to FIG. 2 and FIG. 3, a radio interface protocol horizontally consists of a physical layer, a data link layer and a network layer. And, the radio interface protocol vertically consists of a user plane for data information transfer and a control plane for control signal delivery (signaling). In particular, FIG. 2 shows the respective layers of the radio protocol control plane and FIG. 3 shows the respective layers of the radio protocol user plane. The radio protocol layers shown in FIG. 2 and FIG. 3 can be divided into L1 (first layer), L2 (second layer) and L3 (third layer) based on three lower layers of the open system interconnection (OSI) reference model widely known in the field of communication systems.

The respective layers of the radio protocol control plane shown in FIG. 2 and the respective layers of the radio protocol user plane shown in FIG. 3 are explained as follows.

First of all, a physical (PHY) layer of a first layer provides an upper layer with an information transfer service using a physical channel. The physical (PHY) layer is connected to a medium access control (MAC) layer on an upper layer via a transport channel. And, data is transported between the medium access control (MAC) layer and the physical (PHY) layer via the transport channel. In this case, the transport channel can be classified into a dedicated transport channel or a common transport channel according to whether a channel is shared or not. Moreover, data are transported via the physical channel between different physical layers, i.e., between a physical layer of a transmitting side and a physical layer of a receiving side.

Various layers exist in the second layer. First of all, a medium access control (hereinafter abbreviated 'MAC') layer plays a role in mapping various logical channels to various transport channels. And, the MAC layer also plays a role as logical channel multiplexing in mapping several logical channels to one transport channel. The MAC layer is connected to a radio link control (RLC) layer of an upper layer via a logical channel. And, the logical channel can be mainly categorized into a control channel for transferring information of a control plane and a traffic channel for transferring information of a user plane according to a type of the transferred information.

A radio link control (hereinafter abbreviated RLC) of the second layer performs segmentation and concatenation on data received from an upper layer to play a role in adjusting a size of the data to be suitable for a lower layer to transfer the data to a radio section. And, the RLC layer provides three kinds of RLC modes including a transparent mode (hereinafter abbreviated TM), an unacknowledged mode (hereinafter abbreviated UM) and an acknowledged mode (hereinafter abbreviated AM) to secure various kinds of QoS demanded by each radio bearer (hereinafter abbreviated RB). In particular, the AM RLC performs a retransmission function through automatic repeat and request (ARQ) for the reliable data transfer.

A packet data convergence protocol (hereinafter abbreviated PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE system, the PDCP layer performs a security function as well. This consists of ciphering for preventing data interception conducted by a third party and integrity protection for preventing data manipulation conducted by a third party.

A radio resource control (hereinafter abbreviated RRC) layer located at a most upper part of a third layer is defined in the control plane only and is responsible for controlling a logical channel, a transport channel and physical channels in association with configuration, reconfiguration and release of radio bearers (hereinafter abbreviated RBs). In this case, the RB means a logical path provided by the first and second layers of the radio protocol for the data delivery between the user equipment and the UTRAN. Generally, configuring an RB means to stipulate characteristics of radio protocol layers and channels required for providing a specific service and also means to configure detailed parameters and operational methods thereof. The RB can be classified into a signaling RB (SRB) or a data RB DRB). The SRB is used as a path for sending an RRC message in a control plane (C-plane) and the DRB is used as a path for transferring user data in a user plane (U-plane).

As a downlink transport channel for transporting data to a user equipment from a network, there is a broadcast channel (BCH) for transmitting system information and a downlink shared channel (SCH) for transmitting a user traffic or a control message. Downlink multicast, traffic of a broadcast service or a control message can be transmitted on downlink SCH or a separate downlink MCH (multicast channel). Meanwhile, as an uplink transport channel for transmitting data to a network from a user equipment, there is a random access channel (RACH) for transmitting an initial control message or an uplink shared channel (SCH) for transmitting user traffic or a control message.

As a downlink physical channel for transmitting information transferred on a downlink transport channel to a radio section between a network and a user equipment, there is a physical broadcast channel for transferring information of BCH, a physical multicast channel (PMCH) for transmitting information of MCH, a physical downlink shared channel for transmitting information of PCH and downlink SCH or a physical downlink control (or called DL L1/L2 control channel) for transmitting control information provided by first and second layers.

As an uplink physical channel for transmitting information forwarded on an uplink transport channel to a radio section between a network and a user equipment, there is a physical uplink shared channel (PUSCH) for transmitting information of uplink SCH, a physical random access channel (PRACH) for transmitting RACH information or a physical uplink control channel (PUCCH) for transmitting such control information, which is provided by first and second layers, as HARQ ACK, HARQ NACK, scheduling request (SR), channel quality indicator (CQI) report and the like.

Based on the above description, a random access procedure provided by the LTE system is schematically explained as follows.

First of all, a user equipment performs a random access procedure if one of following cases takes place.

User equipment performs an initial access without an RRC connection with a base station.

User equipment initially accesses a target cell in a handover process.

Random access process is requested according to a command given by a base station.

Data to be transmitted in uplink is generated when time synchronization of uplink is not matched or a radio resource allocated for requesting a radio resource is not allocated.

Reconstruction process is performed in case of radio link failure or handover failure.

In selecting a random access preamble, the LTE system provides both a contention based random access procedure and a non-contention based random access procedure. In the contention based random access procedure, a user equipment randomly selects one preamble from a specific sequence group and then uses the randomly selected preamble at transmitting the random access preamble. In the non-contention based random access procedure, only a random access preamble assigned to a specific user equipment by a base station is used. Yet, the non-contention based random access procedure is available only in the above-described handover procedure or if it is requested by the command given by the base station.

Meanwhile, a process for a user equipment to perform a random access to a specific base station can mainly include the steps of: (1) transmitting a random access preamble to a base station from a user equipment (hereinafter named a 'message 1' transmitting step if not confused); (2) receiving a random access response from the base station in correspondence to the transmitted random access preamble (hereinafter named a 'message 2' receiving step if not confused); (3) transmitting an uplink message using information contained in the received random access response message (hereinafter named a 'message 3' transmitting step if not confused); and (4) receiving a downlink message corresponding to the uplink message from the base station (hereinafter named a 'message 4' receiving step if not confused). In this process, the user equipment facilitates identification of the uplink transmission from another uplink transmission of a different user equipment through scrambling using prescribed identification information attributed to the message 3 message transmission.

General scrambling of the LTE system is schematically explained in association with the above description as follows.

First of all, in a mobile communication system, a transmitting side performs a scrambling operation in order to identify a user and a base station and to randomize data to transmit. This scrambling is performed in a manner of performing an operation on a sequence generated by pseudo-random method using Modulo 2 addition of transmission data. By this scrambling, transmission data has more random characteristics so that a transmission signal can have a balanced transmission power characteristic. And, a pseudo-random sequence is differently generated according to a user or a base station so that the user or the base station can be identified.

And, it is able to generate the pseudo-random sequence using an identifier (RNTI) related to the corresponding data transmission. For instance, if a user equipment receives an uplink resource allocation (UL grant) via PDCCH (physical downlink control channel) on which a cell identifier (C-RNTI) of itself is marked, the user equipment transmits data in uplink through the resource allocated by the UL grant. In this case, a pseudo-random sequence is generated from the data using the C-RNTI of the user equipment and the scrambling is then performed by operating the sequence and the data together.

However, relating to the above-described random access procedure, it is necessary to further discuss in detail what kind of identification information is used to perform the scrambling in each process and how to set the corresponding random access procedures and processing modules.

SUMMARY OF THE INVENTION

Accordingly, the present invention is directed to a random access method for improving scrambling efficiency that substantially obviates one or more problems due to limitations and disadvantages of the related art.

An object of the present invention is to provide an apparatus for improving scrambling/descrambling performance and method thereof, in which scrambling/descrambling is performed in a random access procedure within a mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing a random access to a specific network by a terminal comprises transmitting a random access preamble message including a prescribed preamble, receiving terminal identification information and uplink (UL) grant information via a random access response message corresponding to the random access preamble message, scrambling an uplink transmission signal using the terminal identification information value received via the random access response message, and transmitting the scrambled uplink transmission signal to correspond to the uplink grant information.

Preferably, the random access to the specific network corresponds to a contention based random access and the method further includes setting the terminal identification information value received via the random access response message before the scrambled uplink transmission signal is transmitted.

More preferably, scrambling the uplink transmission signal includes delivering the received uplink grant information to a physical layer of the terminal from a MAC (medium access control) layer of the terminal, generating a scrambling sequence using the terminal identification information value at the physical layer of the terminal, and scrambling the uplink transmission signal using the generated scrambling sequence.

Preferably, the method further includes retransmitting the uplink transmission signal after scrambling the uplink transmission signal using the terminal identification information value received via the random access response message.

Preferably, the scrambled uplink transmission signal is transmitted via a physical uplink sharing channel (PUSCH). Preferably, the terminal identification information received via the random access response message includes a temporary cell RNTI (temporary cell radio network temporary identifier).

In another aspect of the present invention, a terminal, which performs a random access to a specific network, includes a transmitting module transmitting a random access preamble message and an uplink transmission signal corresponding to uplink (UL) grant information, a receiving module receiving a random access response message corresponding to the random access preamble message, and a scrambling module scrambling the uplink transmission signal using a terminal identification information value, wherein the transmitting module, the receiving module and the scrambling module is a physical layer module, and wherein the scrambling module scrambles the uplink transmission signal using a specific terminal identification information value received by the receiving module via the random access response message.

Preferably, the receiving module additionally receives specific uplink grant information via the random access response message and the transmitting module transmits the uplink transmission signal scrambled by the scrambling module based on the specific uplink grant information.

More preferably, the terminal further includes a MAC layer module, and the receiving module delivers the received random access response message to the MAC layer module.

In this case, if the random access corresponds to a contention based random access, the MAC layer module sets the specific terminal identification information received via the random access response message before the transmitting module transmits the uplink transmission signal based on the specific uplink grant information.

Moreover, the MAC layer module delivers the specific uplink grant information in the random access response message to the transmitting module, the scrambling module generates a scrambling sequence using the specific terminal identification information value set by the MAC layer module, and the scrambling module scrambles the uplink transmission signal using the generated scrambling sequence.

Preferably, the transmitting module transmits the uplink transmission signal via a physical uplink sharing channel (PUSCH).

Preferably, the specific terminal identification information received via the random access response message includes a temporary cell RNTI (temporary cell radio network temporary identifier).

In a further aspect of the present invention, a method of controlling a random access of the terminal includes the steps of receiving a random access preamble message from the terminal, transmitting terminal identification information and uplink (UL) grant information via a random access response message corresponding to the random access preamble message, receiving an uplink transmission message from the terminal to correspond to the uplink grant information, and descrambling the uplink transmission message using the terminal identification information transmitted via the random access response message.

Preferably, the terminal identification information transmitted via the random access response message includes a temporary cell RNTI (temporary cell radio network temporary identifier).

Accordingly, the present invention provides the following effects and/or advantages.

First of all, a base station is able to normally perform a descrambling operation on a third message scrambled with an identifier of a user equipment. In particular, the base station is able to perform descrambling of the third message using a temporary C-RNTI transmitted via a second message transmission.

Secondly, a user equipment failing to have a cell identifier allocated thereto is able to perform scrambling with its identifier. Therefore, randomization performance is raised and interference is minimized.

Thirdly, in case that a temporary C-RNTI is used, a range of a pseudo-random sequence, which can be generated by a user equipment at a transmission timing point of a third message, is considerably extended. Therefore, randomization performance is raised and interference with an adjacent cell is minimized as well as interference within a cell of the user equipment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for a format of a random access response message received via a second message according to a prior art;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In the following detailed description of the invention includes details to help the full understanding of the present invention. Yet, it is apparent to those skilled in the art that the present invention can be implemented without these details. For instance, although the following detailed description is made in detail on the assumption that a mobile communication system is the 3GPP LTE system, it is applicable to other prescribed mobile communication systems by excluding unique items of the 3GPP LTE.

Occasionally, the structures and devices known to the public are omitted to avoid conceptional vagueness of the present invention or can be illustrated as block diagrams centering on their core functions.

In the following description, assume that a terminal is a generic term of such a mobile or fixed user-end device as a user equipment (UE), a mobile station (MS) and the like. And, assume that a base station is a generic name of any node of a network end, which communicates with a terminal, such as a Node B, an eNnode B and the like.

Relating to what kind of identification is used to perform scrambling in each process in association with a random access procedure and how to set up corresponding procedures and processing modules, the random access procedure, to which the present invention will be applied, is explained in detail as follows.

Figure 1:
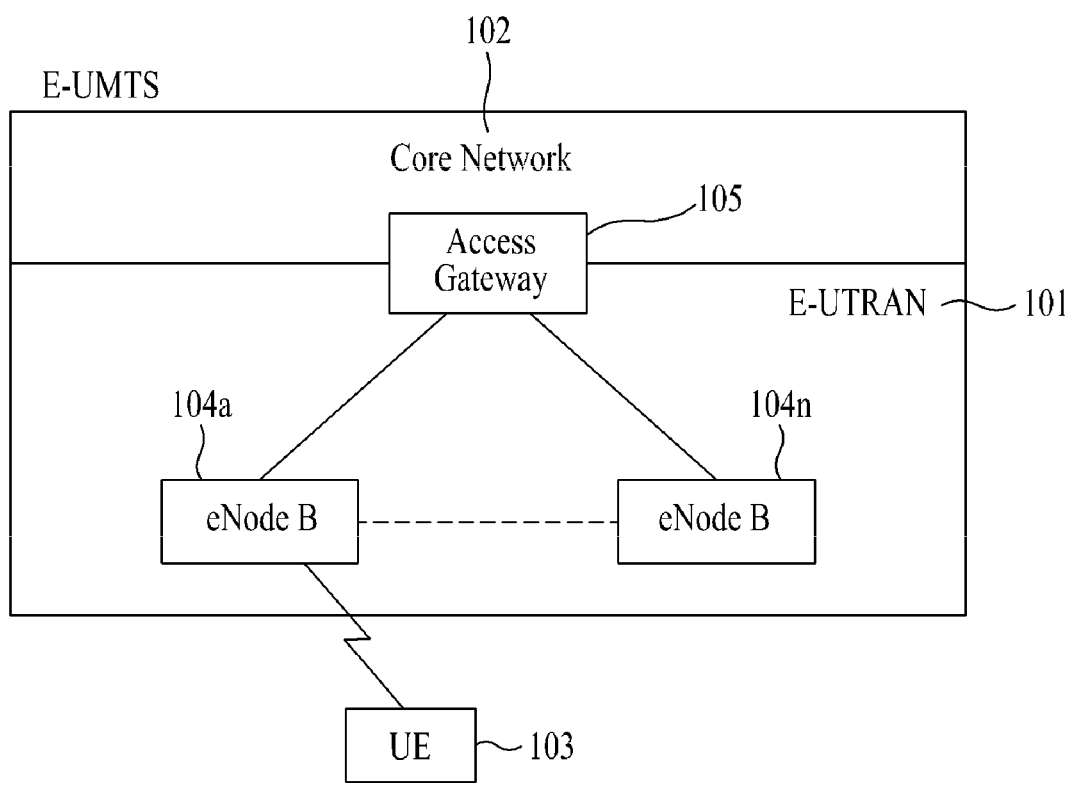
FIG. 1 is a schematic diagram of E-UMTS network structure according to a prior art for a mobile communication system.
Figure 2:
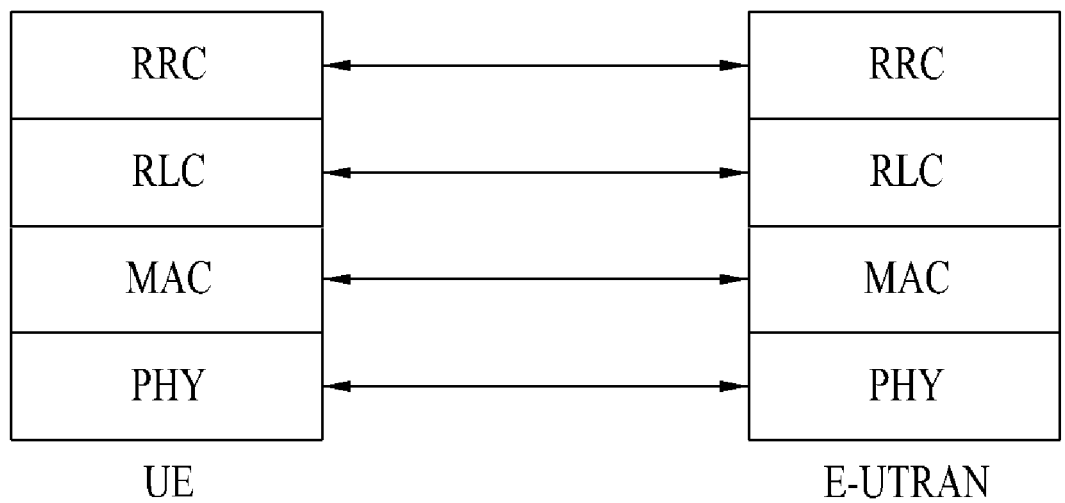
FIG. 2 and FIG. 3 are diagrams for structures of a radio interface protocol between a user equipment and UTRAN based on the prior art of the 3GPP radio access network specifications.
Figure 3:
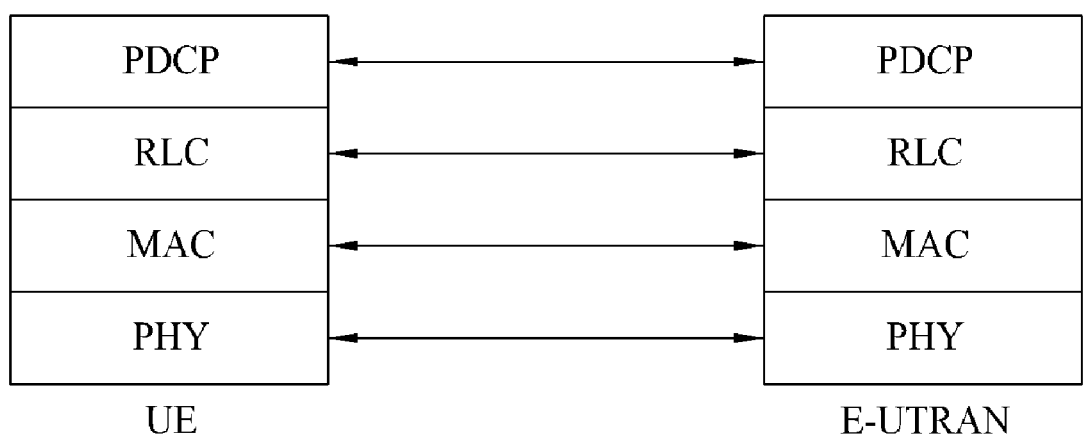
Figure 4:
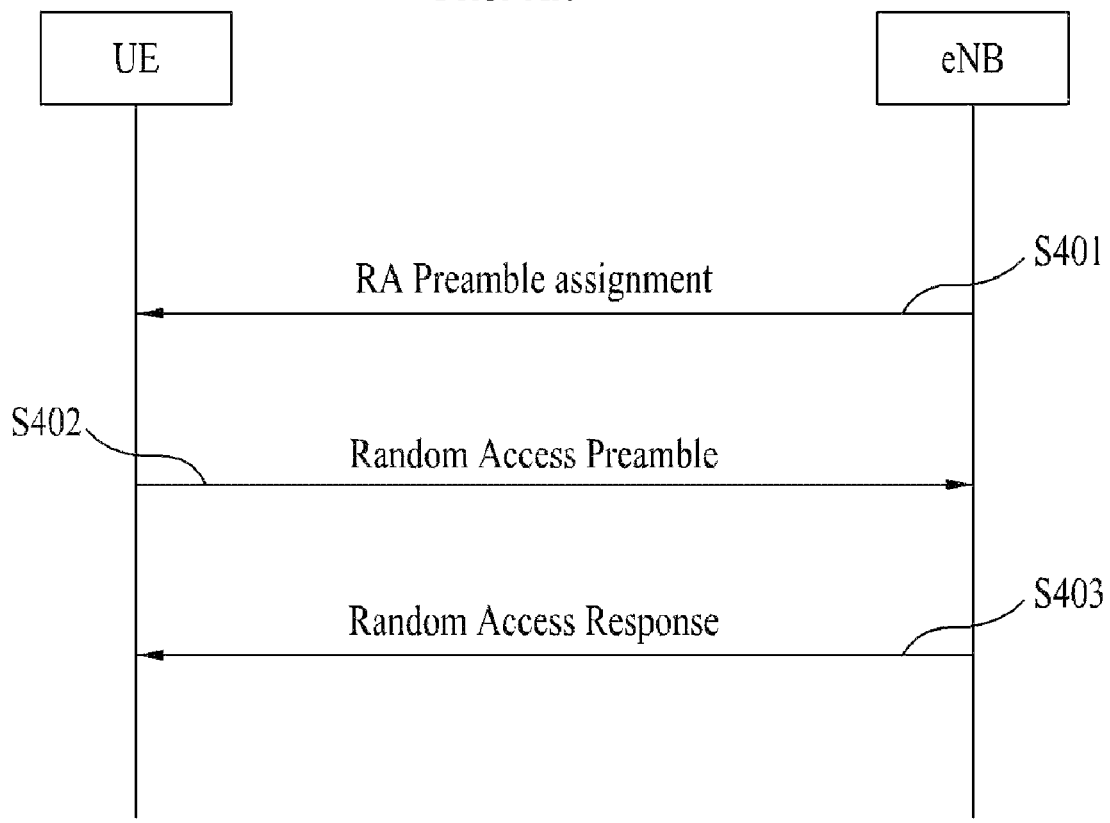
FIG. 4 is a diagram for an operation process between a user equipment and a base station in a non-contention based random access procedure according to a prior art.

FIG. 4 shows an operation process between a terminal and a base station in a non-contention based random access procedure.

(1) Random Access Preamble Assignment

As mentioned in the foregoing description, a non-contention based random access procedure can be performed in case of: (i) a handover process; and (ii) a request by a command given by a base station. Of course, in both of the above two cases, it is able to perform a contention based random access procedure.

First of all, for a non-contention based random access procedure, it is important to receive a specified random access preamble, which is free from collision, from a base station. As a method of specifying the random access preamble, there is a method via a handover command or a method via a PDCCH command. Through this, a random access preamble is assigned to a terminal [S401].

(2) First Message (Message-1) Transmission

As mentioned in the above description, after the random access preamble specified to the terminal only has been assigned to the terminal, the terminal then transmits the preamble to a base station [S402].

(3) Second Message (Message-2 Reception

After the terminal has transmitted the random access preamble in the step S402, it attempts a reception of its random access response within a random access response reception window instructed via system information or handover command of the base station [S403]. In particular, the random access response information can be transmitted in a format of MAC PDU (MAC packet data unit). In this case, the MAC PDU can be delivered via PDSCH (physical downlink shared channel).

Preferably, in order to appropriately receive the information carried on the PDSCH, the terminal monitors PDCCH (physical downlink control channel). In particular, it is preferable that information of the terminal for receiving the PDSCH, a frequency of a radio resource of the PDSCH, time information, a transmission format of the PDSCH and the like are contained in the PDCCH.

Once the terminal succeeds in the reception of the PDCCH transmitted to itself, it can appropriately receive a random access response carried on the PDSCH according to informations of the PDCCH. And, the random access response can include a random access preamble identifier (ID), an uplink grant (UL grant) indicating an uplink radio resource, a temporary cell identifier (temporary C-RNTI) and a time synchronization correction value (timing advance command: TAC).

As mentioned in the above description, a random access preamble identifier is necessary for a random access response. Since random access response information for at least one terminals can be included in one random access response, it is necessary to indicate the uplink grant (UL grant), the temporary C-RNTI and TAC are valid for a prescribed terminal. In this step, it is assumed that the terminal selects a random access preamble identifier matching the former random access preamble selected by the terminal in the step S402.

In the non-contention based random access procedure, it is determined the random access has been successfully performed if random access response information is received. It is then able to end the random access procedure.

Figure 5:
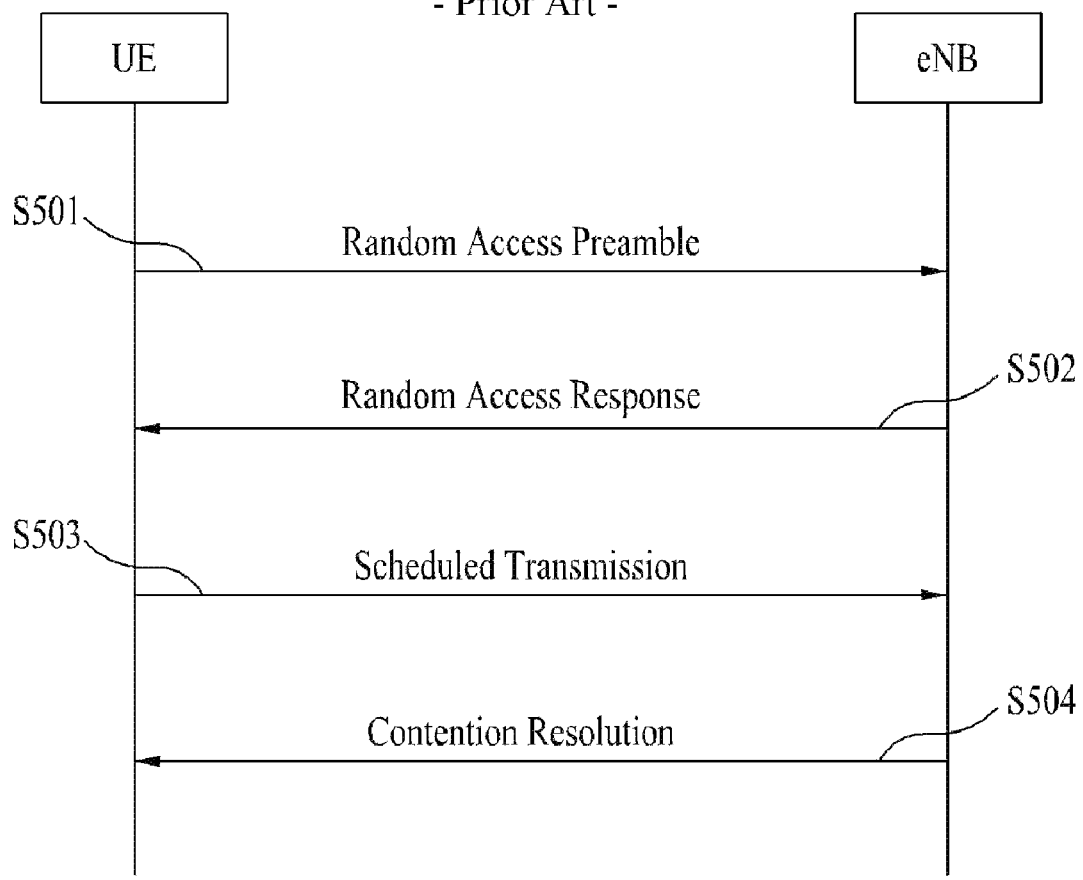
FIG. 5 is a diagram for an operation process between a user equipment and a base station in a contention based random access procedure according to a prior art.

FIG. 5 is a diagram for an operation process between a terminal and a base station in a contention based random access procedure.

(1) First Message Transmission

First of all, a terminal randomly selects one random access preamble from a set of random access preambles indicated by system information or a handover command. The terminal selects a PRACH (physical RACH) resource capable of carrying the random access preamble and is then able to transmit the corresponding random access preamble [S501].

(2) Second Message Reception

A method of receiving random access response is similar to the aforesaid non-contention based random access procedure. In particular, after the terminal has transmitted the random access preamble, as shown in the step S501, the terminal attempts a reception of its random access response on PDCCH within a random access response receiving window instructed by the system information or the handover command of a base station. The terminal then receives PDSCH via corresponding RA-RNTI information [S502]. Through the received PDSCH, the terminal is able to receive uplink grant (UL grant), temporary cell identifier (temporary C-RNTI), time synchronization correction value (timing advance command: TAC) and the like.

(3) Third Message Transmission

If the terminal receives a random access response valid to itself, the terminal processes informations contained in the random access response. In particular, the terminal applies the TAC and stores the temporary C-RNTI. The terminal also transmits data (i.e., a third message) to the base station using the UL grant [S503]. In this case, it is preferable that the third message contains an identifier of the terminal since a base station is unable to determine which terminal performs the random access procedure in the contention based random access procedure when the third message does not contains the identifier of the terminal. Thus it is preferable to identify a terminals for a future contention resolution.

Two kinds of methods have been discussed as a method of having a terminal identifier included. In a first method, if a terminal has a valid cell identifier assigned in a corresponding cell prior to the random access procedure, the terminal transmits its cell identifier via an uplink transmission signal corresponding to the UL grant. If the valid cell identifier is not assigned prior to the random access procedure, the terminal transmits its unique identifier (e.g., S-TMSI, a random ID, etc.). The unique identifier is generally longer than the cell identifier. If the terminal transmits data corresponding to the UL grant, the terminal initiates a timer for collision solution (contention resolution timer).

(4) Fourth Message Reception

After the terminal has transmitted the data containing its identifier using the UL grant contained in the random access response, the terminal waits for an instruction of the base station for the contention resolution. In particular, the terminal attempts a reception of PDCCH to receive a specific message [S504].

Two kinds of methods have been discussed as a method of receiving the PDCCH. As mentioned in the foregoing description, if the third message transmitted based on the UL grant is transmitted using it the cell identifier, the terminal attempts the reception of the PDCCH using its cell identifier.

If the identifier is a unique identifier, the terminal is able to attempt the reception of the PDCCH using the temporary C-RNTI contained in the random access response.

Thereafter, in the former case, if the terminal received the PDCCH through its cell identifier before the contention resolution timer expires, the terminal determines that the random access procedure is successfully performed. The terminal then ends the random access procedure. In the latter case, if the terminal received the PDCCH via the temporary C-RNTI before the contention resolution timer expires, the terminal checks the data carried on the PDSCH instructed by the PDCCH. If the unique identifier of the terminal is included in the content of the data, the terminal determines that the random access procedure is successfully performed. The terminal then ends the random access procedure.

Meanwhile, as mentioned in the foregoing description, in the random access procedure, and more particularly, in the contention based random access procedure, if the identifier of the terminal is included in the third message and the scrambling for the third message transmission is set to use the terminal identifier, the following problem may be caused. Namely, the base station is able to confirm the identifier of the terminal only if the base station normally receives the third message and succeeds in decoding of the third message. Yet, since a timing point for the base station to perform a descrambling operation after receiving the third message is a timing point for checking the identifier of the terminal, the base station is unable to know the identifier of the terminal in performing the descrambling operation. In particular, the base station should obtain the terminal identifier through the descrambling of the third message. If the terminal identifier is required for the descrambling of the third message, the base station is difficult to obtain the terminal identifier.

At the third message transmission timing point, the terminal may or may not have the cell identifier, which was assigned by the base station, of the terminal. In case that the terminal fails to have the cell identifier assigned by the base station, the terminal is unable to scramble the third message with the identifier of the terminal. Therefore, interference between a corresponding cell and an adjacent cell may be raised.

In a random access procedure according to one preferred embodiment of the present invention, in case that a terminal transmits data using a UL grant included in a random access response, an identifier used for the data scrambling is set to use identification information shared between the terminal and a base station. Preferably, a scrambling sequence is generated using a temporary C-RNTI carried by a second message. A third message is then transmitted using the scrambling sequence generated based on the temporary C-RNTI. Thus, the above-mentioned problem can be solved. This scheme is applicable to perform scrambling in transmitting an uplink transmission signal that follows the reception of the second message in a non-contention based random access procedure. Yet, in the following description, an example is explained centering on a contention based random access procedure for transmitting a third message in correspondence to a UL grant carried by a second message.

Figure 6:
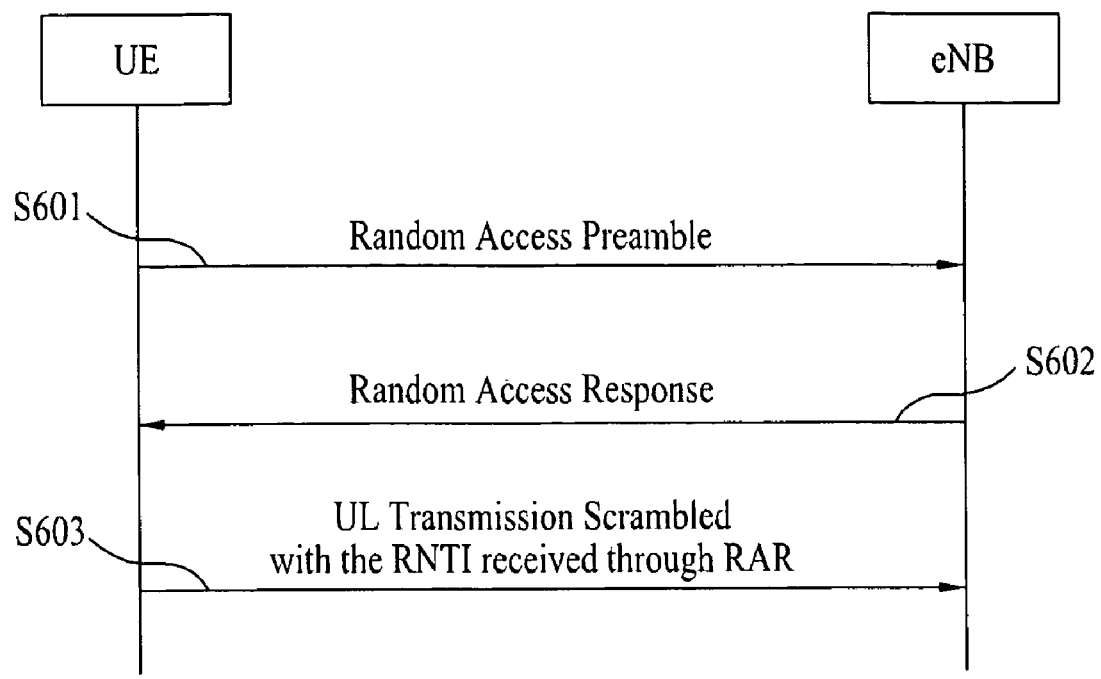
FIG. 6 is a diagram for a method of performing a contention based random access between a user equipment and a base station according to one embodiment of the present invention.

FIG. 6 is a diagram for a method of performing a contention based random access between a terminal and a base station according to one embodiment of the present invention.

(1) First Message Transmission

As a random access procedure is requested, a terminal randomly selects a random access preamble by a MAC layer and is then able to transmit the selected random access preamble to a base station [S601].

(2) Second Message Reception

The terminal receives a random access response including a random access preamble identifier corresponding to the random access preamble transmitted by itself [S602]. The random access response can include a random access preamble identifier (RA-RNTI), a UL grant, a temporary C-RNTI and TAC. Detailed structure of the random access response is shown in FIG. 7.

FIG. 7 is a diagram for a format of a random access response message received via a second message.

Referring to FIG. 7, 'R' indicates a reserved bit and is assumed as set to 0. An uplink grant indicates an uplink resource that will be used for uplink transmission. A TAC field is used to control a size of timing adaptation a terminal should apply. And, a temporary C-RNTI indicates a temporary identifier a terminal uses for a random access procedure. In this case, the temporary C-RNTI has a 16-bit length.

Meanwhile, a MAC layer of a terminal stores a temporary C-RNTI received via a random access response. And, the MAC layer of the terminal controls the physical layer to generate a pseudo-random sequence using the set temporary C-RNTI and scramble data using the generated pseudo-random sequence at transmitting the message.

Preferably, the terminal receives a random access response shown in FIG. 7, sets a temporary C-RNTI contained in the response no later than a third message transmission, and then directly informs a physical layer of the setting. In the present embodiment, since it is assumed that a temporary C-RNTI received via the second message is used in the transmission of the third message, if a timing point of enabling a MAC layer to set a temporary C-RNTI is behind a third message transmission timing point, it is difficult for the physical layer to apply scrambling to the third message transmission.

(3) Third Message Transmission

The terminal transmits a third message to the base station using the UL grant contained in the random access response [S603]. Preferably, a C-RNTI (or, a C-RNTU MAC control element) of the terminal or an uplink CCCH SDU is contained in the third message. And, it is assumed that the third message is transmitted via PUSCH. Moreover, the present embodiment proposes to perform scrambling using a pseudo-random sequence which is generated using terminal identification information secured to be shared between the base station and the terminal at a third message transmission timing point, and preferably, using a temporary C-RNTI received via the random access response having the structure shown in FIG. 7.

The identification information, which is secured to be shared between the base station and the terminal at the third message transmission timing point, can consider to use RA-RNTI or C-RNTI=0 as well as the temporary C-RNTI. Yet, the RA-RNTI is an identifier assigned to identify what kind of a time-frequency resource is used for the terminal to transmit a random access preamble. Since the number of available identifiers is smaller than that of the temporary RNTIs, it is difficult to identify a sufficient number of terminals in case of the RA-RNTI.

Besides, 'performing the scrambling using the C-RNTI=0' has the same meaning of 'not applying the scrambling', which causes a problem that a randomization gain is not obtained from the scrambling.

Thus, according to the present embodiment, the scrambling is performed using the temporary C-RNTI received via the second message and its details are explained as follows.

First of all, a physical layer of a terminal generates a pseudo-random sequence as a scrambling sequence in a manner of setting a temporary C-RNTI set by a MAC layer to an initial value of the pseudo-random sequence. In case of the LTE system, a pseudo-random sequence is defined using the following gold sequence having a length of 31.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Formula 1]}$$

In Formula 1, an outputted pseudo-random sequence $c(n)$ is provided by a first m-sequence $x_1(n)$ and a second m-sequence $x_2(n)$ [where $n=0, 1, 2, \ldots, M_{PN}-1$]. And, it is $N_C=1600$. $M_{PN}$ indicates a sequence length. The first m-sequence is initialized into $x_1(0)=1$ and $x_1(n)=0$, where $n=1, 2, \ldots, 30$. And, the second 2m-sequence is initialized by $$c_{init} = \sum_{i=0}^{30} x_2(i)\cdot 2^i.$$

In this case, a value of $C_{init}$ is determined according to a usage of a sequence to use. And, the present embodiment proposes to use the following initial value in order to perform a third message transmission via PSUCH.

$$c_{init}=n_{RNTI}2^{14}+\lfloor n_s/2\rfloor 2^9+N_{ID}^{cell} \quad \text{[Formula 2]}$$

In Formula 2, $n_s$ indicates a slot number within a radio frame, $N_{ID}^{cell}$ indicates a physical layer cell identifier, and $n_{RNTI}$ indicates an RNTI value for a corresponding PUSCH transmission. Moreover, $\lfloor n_s/2 \rfloor$ means a maximum integer which does not exceed $n_s/2$. Hence, in case of applying the present embodiment to the LTE system, the present embodiment proposes the following steps. First of all, an initial value $C_{init}$ for a PUSCH transmission is generated by setting a temporary C-RNTI value to $n_{RNTI}$, a pseudo-random sequence is generated using the generated initial value for initialization of the second m-sequence, and this sequence is then used for the scrambling performed for a third message transmission.

In the following description, a structure of a terminal performing the above-described embodiment is explained.

Figure 8:
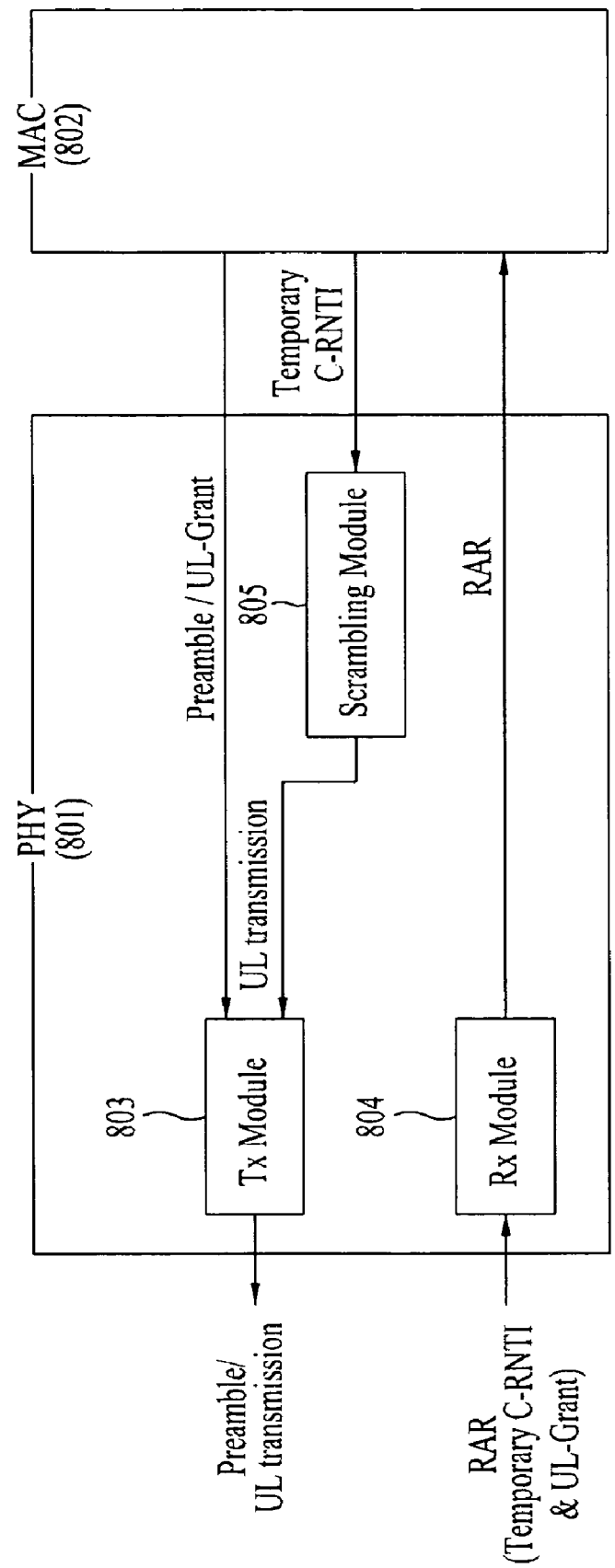
FIG. 8 is a schematic block diagram of a user equipment for performing a random access according to one embodiment of the present invention.

FIG. 8 is a schematic block diagram of a terminal for performing a random access according to one embodiment of the present invention.

Referring to FIG. 8, a terminal according to the present embodiment includes a physical layer module 801 and a MAC layer module 802. And, the physical layer module 801 is able to include a transmitting module 803, a receiving module 804, a scrambling module 805 and the like.

Based on the above structure, operations according to the present embodiment are explained as follows.

First of all, in case of a contention based random access procedure, a random access preamble selected by the MAC layer module 802 is delivered to the transmitting module 803. The transmitting module 803 is then able to transmit the random access preamble to a base station by having the random access preamble contained in the first message.

Subsequently, the terminal monitors whether a signal indicating an RA-RNTI corresponding to a previously transmitted random access preamble is transmitted via PDCCH within a window having a prescribed size. If the signal indicating the RA-RNTI corresponding to the previously transmitted random access preamble is transmitted via the PDCCH within the corresponding window, a physical layer of the terminal, and more particularly, the receiving module 804 is able to deliver a transport block (TB), which includes a random access response (RAR), to a MAC layer.

In this case, TAC information, UL grant information and temporary C-RNTI information, as shown in FIG. 7, are contained in the delivered MAC random access response message (MAC RAR).

The MAC layer 802 of the terminal having obtained the above informations delivers the UL-grant information in the received RAR message to the physical layer 801.

The MAC layer 802 of the present embodiment sets up a temporary C-RNTI value obtained through the RAR received prior to a transmission of the third message via the transmitting module 803 of the physical layer 801 and then delivers the setup value to the scrambling module 805 of the physical layer 801.

The scrambling module 805 having received the temporary C-RNTI value from the MAC layer 802 generates a scrambling sequence using the temporary C-RNTI value as an initial value of the pseudo-random sequence and then scrambles an uplink transmission signal corresponding to a UL grant using the generated scrambling sequence. In case of the LTE system, the scrambling module 805 performs a process of adding up the uplink transmission signal corresponding to the UL grant and the generated scrambling sequence together using a Modulo-2 adder (not shown in the drawing).

The transmission signal scrambled by the scrambling module 805 is delivered to the transmitting module 803. The transmitting module 803 is then able to transmit the scrambled uplink transmission signal through time-frequency resource region.

Meanwhile, 'performing the scrambling using the identification information received via the second message' in the above description is applicable to a retransmission of a third message as well as to an initial transmission of the third message.

Figure 9:
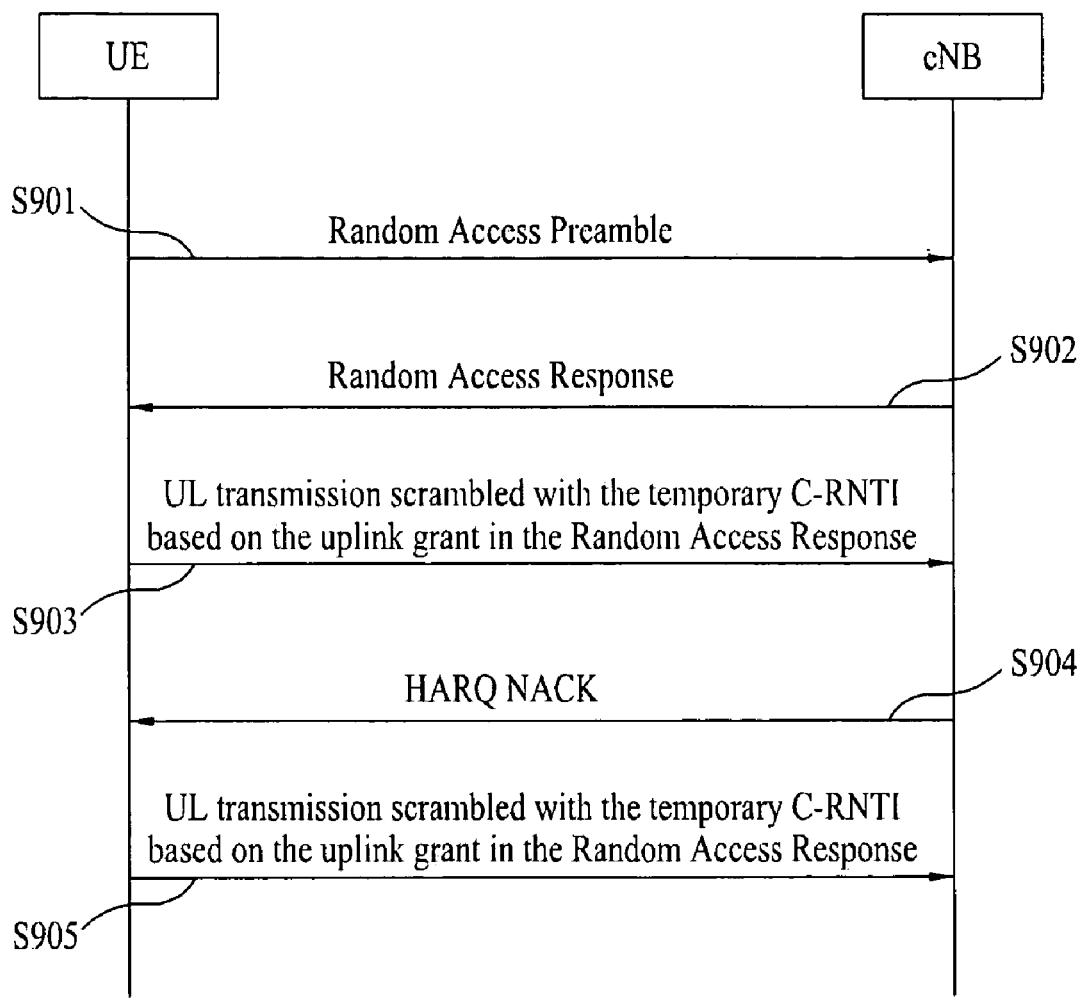
FIG. 9 is a diagram for explaining a process that a user equipment performs a random access to a specific base station according to one embodiment of the present invention.

FIG. 9 is a diagram for explaining a process that a terminal performs a random access to a specific base station according to one embodiment of the present invention.

Referring to FIG. 9, a first message transmission S901, a second message reception S902 and a third message transmission S903 are identical to the former first message transmission S601, the former second message reception S602 and the former third message transmission S603 of FIG. 6, respectively.

As mentioned in the foregoing description, after transmitting the third message scrambled using the temporary C-RNTI received via the second message, the terminal may not receive feedback information indicating a success of the third message reception from the base station. In particular, the terminal may receive NACK from the base station [S904]. If so, the terminal is able to perform a retransmission of the third message.

According to the present embodiment, in the retransmission of the third message, the terminal performs the scrambling using the pseudo-random sequence generated using the temporary C-RNTI contained in the random access response information.

As mentioned in the above descriptions of the embodiments of the present invention, scrambling of the third message is performed in a random access procedure using an identifier contained in a random access response message, e.g., a pseudo-random sequence generated using C-RNTI. Therefore, the base station is able to normally descramble the third message having been scrambled with the identifier of the terminal. In particular, the base station is able to descramble the third message using the temporary C-RNTI transmitted in the second message transmission.

Meanwhile, according to the present embodiment, a terminal failing to have a cell identifier assigned thereto is able to perform scrambling with its cell identifier. Therefore, randomization performance is raised and interference is minimized.

Moreover, in case of using a temporary C-RNTI, since a range of a pseudo-random sequence, which can be generated by a terminal at a transmission timing point of a third message, is considerably extended, randomization performance is raised. And, interference with an adjacent cell can be minimized as well as interference within a cell of the terminal.

Accordingly, the random access technology and the terminal structure for the same are described with reference to the example applied to the 3GPP LTE system and are also applicable to various mobile communication systems having the similar random access procedures.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing a random access to a specific network by a terminal, the method comprising:
   transmitting a random access preamble message including a prescribed preamble;
   receiving a random access response message including a Temporary C-RNTI (temporary cell radio network temporary identifier) value and uplink (UL) grant information in response to the random access preamble message;
   setting terminal identification information of the terminal as the Temporary C-RNTI value received via the random access response message by a MAC (Medium Access Control) layer of the terminal;
   delivering the received uplink grant information to a physical layer of the terminal from the MAC layer of the terminal;
   generating, at the physical layer of the terminal, a scrambling sequence as a pseudo-random sequence using a first m-sequence having a first initial value and a second m-sequence having a second initial value, wherein one of the first and the second initial values is set by using the terminal identification information set as the Temporary C-RNTI value received via the random access response message, a slot number, and a physical layer cell identifier, wherein the setting of the terminal identification information as the Temporary C-RNTI value by the MAC layer is performed before the setting of one of the first and the second initial values at the physical layer;
   scrambling the uplink transmission signal using the generated pseudo random sequence; and
   transmitting the scrambled uplink transmission signal through a resource region corresponding to the uplink grant information.

2. The method of claim 1, wherein the random access to the specific network is a contention based random access.

3. The method of claim 1, further comprising:
   retransmitting the uplink transmission signal after re-scrambling the uplink transmission signal using the Temporary C-RNTI value when the scrambled uplink transmission signal is not successfully received by a receiving party.

4. The method of claim 1, wherein the scrambled uplink transmission signal is transmitted via a physical uplink sharing channel (PUSCH).

5. A terminal to perform a random access to a specific network, the terminal comprising:
- a MAC (Medium Access Control) layer module;
- a physical layer module, wherein the physical layer module comprises:
  - a transmitting module transmitting a random access preamble message and an uplink transmission signal through a resource region corresponding to uplink (UL) grant information;
  - a receiving module receiving a random access response message comprising a Temporary C-RNTI (temporary cell radio network temporary identifier) value and specific uplink (UL) grant information in response to the random access preamble message; and
  - a scrambling module scrambling the uplink transmission signal using terminal identification information of the terminal set as certain value,
- wherein the receiving module delivers the received random access response message to the MAC layer module,
- wherein the scrambling sequence is generated by the scrambling module of the physical layer module as the pseudo random sequence using a first m-sequence having a first initial value and a second m-sequence having a second initial value, wherein one of the first and the second initial values is set by using the terminal identification information set as the Temporary C-RNTI value by the MAC layer module, a slot number, and a physical layer cell identifier,
- wherein the MAC layer module sets the terminal identification information of the terminal as the Temporary C-RNTI value included in the random access response message received by the receiving module before the setting of one of the first and the second initial values at the physical layer module,
- wherein the MAC layer module delivers the specific uplink grant information in the random access response message to the transmitting module, and
- wherein the scrambling module scrambles the uplink transmission signal using the generated pseudo random sequence.

6. The terminal of claim 5, wherein the transmitting module transmits the uplink transmission signal via the resource region corresponding to the specific uplink grant information within a physical uplink sharing channel (PUSCH).

7. The terminal of claim 5, wherein the uplink transmission signal is retransmitted by re-scrambling the uplink transmission signal using the Temporary C-RNTI value, when the scrambled uplink transmission signal is not successfully received by a receiving party.

8. The method of claim 1, wherein the pseudo random sequence is generated based on:
- ((the first m-sequence)+(the second m-sequence)) mod 2,
  - wherein the first initial value is set as a predetermined value, and
  - wherein the second initial value is set by using the terminal identification information set as the Temporary C-RNTI value received via the random access response message, the slot number, and the physical layer cell identifier.

9. The method of claim 1, wherein the setting of the terminal identification information as the Temporary C-RNTI value is performed, regardless of whether or not the terminal has a C-RNTI (cell radio network temporary identifier) value before receiving the random access response message.

10. The terminal of claim 5, wherein the pseudo random sequence is generated by the scrambling module based on:
- ((the first m-sequence)+(the second m-sequence)) mod 2,
  - wherein the first initial value is set as a predetermined value, and
  - wherein the second initial value is set by using the terminal identification information set as the Temporary C-RNTI value received via the random access response message, the slot number, and the physical layer cell identifier.

11. The terminal of claim 10, wherein the setting of the terminal identification information as the Temporary C-RNTI value is performed, regardless of whether or not the terminal has a C-RNTI (cell radio network temporary identifier) value before receiving the random access response message.

* * * * *